(12) United States Patent
Kakizoe

(10) Patent No.: US 7,066,293 B2
(45) Date of Patent: Jun. 27, 2006

(54) FRONT STRUCTURE OF MOTORCYCLE BODY

(75) Inventor: Takashige Kakizoe, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 10/661,277

(22) Filed: Sep. 12, 2003

(65) Prior Publication Data
US 2004/0094347 A1 May 20, 2004

(30) Foreign Application Priority Data
Sep. 13, 2002 (JP) .......................... P. 2002-269074

(51) Int. Cl.
B62J 6/02 (2006.01)
(52) U.S. Cl. ..................... 180/219; 116/62.1; 340/432; 362/476
(58) Field of Classification Search ................ 180/219, 180/90; 361/473, 475, 576, 427, 432, 461, 361/441, 491.6; 296/70, 73; 362/473, 475, 362/576, 427, 432, 461, 441, 491.6, 474, 362/476
See application file for complete search history.

(56) References Cited

U.S. PATENT DOCUMENTS

| | | | | |
|---|---|---|---|---|
| 4,687,072 A | * | 8/1987 | Komuro | ..................... 180/219 |
| 5,446,628 A | * | 8/1995 | Blom et al. | .................. 362/551 |
| 6,158,279 A | * | 12/2000 | Saiki | ............................ 73/493 |
| 6,249,744 B1 | * | 6/2001 | Morita | ........................ 701/213 |
| 6,439,753 B1 | * | 8/2002 | Sumada et al. | ............. 362/475 |
| 6,484,836 B1 | * | 11/2002 | Tsuji | ............................ 180/90 |
| 6,616,165 B1 | * | 9/2003 | Tsuji | ........................ 280/288.4 |
| 2001/0048403 A1 | | 12/2001 | Tsuji | |

FOREIGN PATENT DOCUMENTS

| | | | |
|---|---|---|---|
| JP | 3-82685 | * | 4/1991 |
| JP | 6-219207 | * | 8/1994 |
| JP | 2000-118465 A | | 4/2000 |
| JP | 2001-341685 A | | 12/2001 |

* cited by examiner

Primary Examiner—Anne Marie Boehler
(74) Attorney, Agent, or Firm—Darby & Darby

(57) ABSTRACT

In a front structure of a motorcycle body, a meter unit is installed in such a manner that it can be shifted between a normal position and a bulb replacing position. The position of the meter unit is set such that, at the normal position, the lower end of the meter unit is lower than the upper end line of a bulb mounting and removing portion disposed in the rear surface of a head lamp unit and, at the bulb replacing position, the meter unit lower rear portion is higher than the upper end line H1 of the bulb mounting and removing portion. The meter unit is mounted directly on the head lamp unit and, when viewed from the side surface of the motorcycle body, the meter unit is superimposed on top of a cowling brace which is used to fix a front cowling.

12 Claims, 9 Drawing Sheets

FRONT STRUCTURE OF MOTORCYCLE BODY

BACKGROUND OF THE INVENTION

The present invention relates to a front structure of a motorcycle body comprising a front cowling including a head lamp unit and a meter unit respectively disposed on the front head portion of the front cowling.

A motorcycle of a type that its body front head portion is covered with a front cowling made of synthetic resin in order to reduce the air resistance thereof is known. In this motorcycle, a head lamp unit is disposed on the front head portion of the front cowling and a meter unit is disposed in the vicinity of the upper rear portion of the head lamp unit.

Further, on the front cowling, there is disposed a transparent screen in order to secure the front view for a rider; and, the screen is designed so as to rise just from the upper portion of the head lamp unit. In order to increase the area of the screen to thereby secure the wide view for the rider, the position of the meter unit may be lowered down as much as possible. For this purpose, the meter unit is mounted in the vicinity of the upper rear portion of the head lamp unit so as to be able not only to secure the front view for the rider but also to secure the visibility of the meter unit.

Generally, in the case of the head lamp unit, bulbs are replaced by removing a lid-shaped or boot-shaped bulb mounting and removing portion disposed in the rear surface of the head lamp unit. However, as described above, since the meter unit is installed in the vicinity of the upper rear portion of the head lamp unit, the meter unit provides an obstacle, that is, the meter unit makes it difficult to mount and remove the bulb mounting portion, so that it is very difficult to replace the bulbs. In case where the meter unit is installed upwardly of the head lamp unit, the bulbs can be replaced easily; however, this structure obstructs the front view for the rider to a great extent.

The case where the meter unit is disposed greatly backwardly of the head lamp unit, while securing the front view for the rider, the efficiency of the bulb replacing operation can be enhanced to a certain degree. However, in this case, not only the visibility of the meter unit is impaired, but also the distance between the head lamp unit and the front head portion (head pipe) of the body frame of the motorcycle is increased to thereby make it necessary to increase the size of the body of the motorcycle.

SUMMARY OF THE INVENTION

The present invention aims at eliminating the drawbacks found in the above-mentioned conventional front structure of the motorcycle body. Accordingly, it is an object of the present invention to provide a front structure of a motorcycle body which can facilitate the bulb replacing operation of the head lamp unit while securing not only the good front view for the rider but also the good visibility of the meter unit, can simplify the peripheral structure of the meter unit, and can enhance the durability of a wire harness to be connected to the meter unit.

In attaining the above object, according to the present invention, there is provided a motorcycle body front structure comprising ahead lamp unit including a bulb mounting and removing portion disposed in the rear surface thereof, and a meter unit disposed in the vicinity of the upper rear portion of the head lamp unit, wherein the meter unit is disposed movablly between a normal position and a bulb replacing position, at the normal position, the lower end portion of the meter unit is positioned lower than the upper end of the bulb mounting and removing portion, and at the bulb replacing position, the lower end portion of the meter unit is positioned higher than the upper end of the bulb mounting and removing portion.

According to the above structure, at the normal position, since the height of the meter unit is prevented from being greatly higher than the head lamp unit, not only the front field of vision for a rider can be secured in a good condition but also the visibility of the meter unit can be prevented from being impaired. At the bulb replacing position, because the meter unit is prevented from being caught by the bulb mounting and removing portion of the rear surface of the head lamp unit, access to the bulb mounting and removing portion can be made easy.

Also, according to another aspect of the present invention, the meter unit is mounted directly on the head lamp unit, and when viewed from side of the motorcycle body, the meter unit is superimposed on top of a cowling brace for fixing a front cowling to the motorcycle body It is possible to simplify the structure of the cowling brace which has been conventionally required to have high rigidity in order to hold the meter unit without causing it to resonate with the riding vibrations of the motorcycle. Also, while avoiding mutual interference between the cowling brace and meter unit, the height of the meter unit can be lowered to thereby secure a good front field of vision for the rider and, at the same time, the bulb replacing operation of the head lamp unit can be facilitated.

Further, according to another aspect of the present invention, the front structure of a motorcycle body further comprises an upper fixing means located on upper back side of the meter unit including a rotating-type fixing portion to hold the meter unit rotatably around a rotation axis extending in the motorcycle width direction, and a lower fixing means located on lower back side of the meter unit including a fastening-type fixing portion to hold the meter unit and restrict the rotational movement of the meter unit, and wherein the normal position is a position where the meter unit is rotated downwardly around the rotation axis, and the bulb replacing position is a position where the meter unit is rotated upwardly around the rotation axis.

According to this structure, if the fastening of the fastening-type fixing portion is loosened and thus the meter unit is rotated upwardly around the rotation axis of the rotating-type fixing portion, the meter unit can be simply shifted to the bulb replacing position, which can further facilitate the bulb replacing operation of the head lamp unit.

Furthermore, according to another aspect of the present invention, the front structure of a motorcycle body is structured such that the rotating-type fixing portion comprises a rotary shaft portion disposed on a member extending in the motorcycle width direction to hold the meter unit, and a fit-in clamp portion disposed on the meter unit for grabbing the rotary shaft portion rotatably. Thanks to this aspect, the efficiency of the mounting and removing operation of the meter unit can be enhanced.

And, according to another aspect of the present invention, the front structure of a motorcycle body further comprises a connecting portion of a wire harness to be connected to the meter unit disposed in the vicinity of the rotation axis of the rotating-type fixing portion. This arrangement can minimize the moving amount of the wire harness connecting portion involved with the rotational movement of the meter unit; and, therefore, not only the rotational movement of the meter unit can be made smooth but also the durability of the wire harness can be enhanced.

DESCRIPTION OF THE PREFFERRED EMBODIMENT

Now, description will be given below of an embodiment of the front structure of a motorcycle body according to the present invention with reference to the accompanying drawings.

Figure 1:
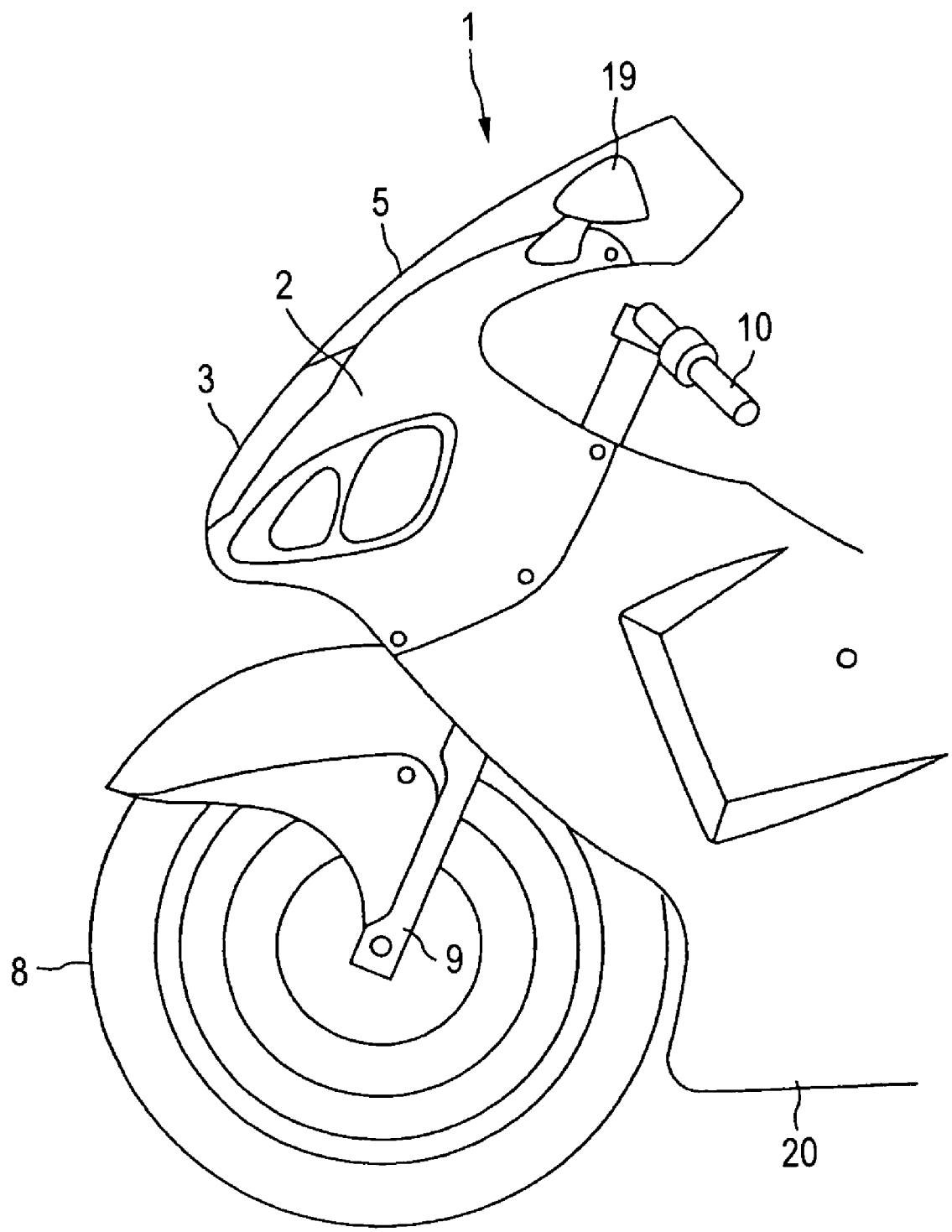
FIG. 1 is a left side view of the front structure of a motorcycle body to which an embodiment of the present invention is applied.
Figure 2:
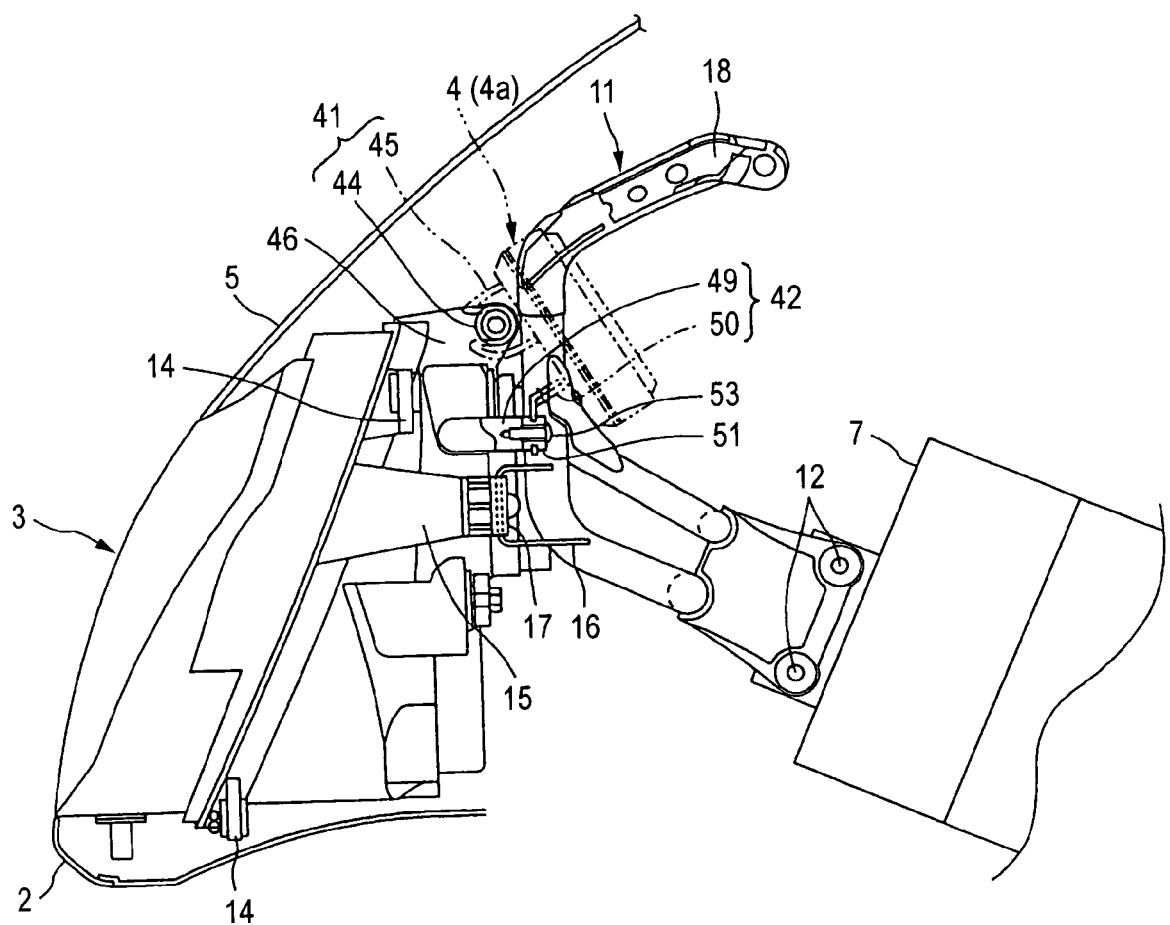
FIG. 2 is a longitudinal section view of the front structure of a motorcycle body according to the present invention.

FIG. 1 is a left side view of the front structure of a motorcycle body to which an embodiment of the present invention is applied, and FIG. 2 is a longitudinal section view of the front structure of a motorcycle body according to the present invention.

In this motorcycle 1, the front head portion of the body frame thereof is covered with a front cowling 2 made of synthetic resin in order to reduce the air resistance thereof, a head lamp unit 3 is mounted on the front head portion of the front cowling 2, and a meter unit 4 is installed in the vicinity of the upper rear portion of the head lamp unit 3. A transparent screen 5 is disposed on the front cowling 2, while a rider can look to the front through the screen 5. The screen 5 is designed so as to rise just from the top portion of the head lamp unit 3.

Figure 3:
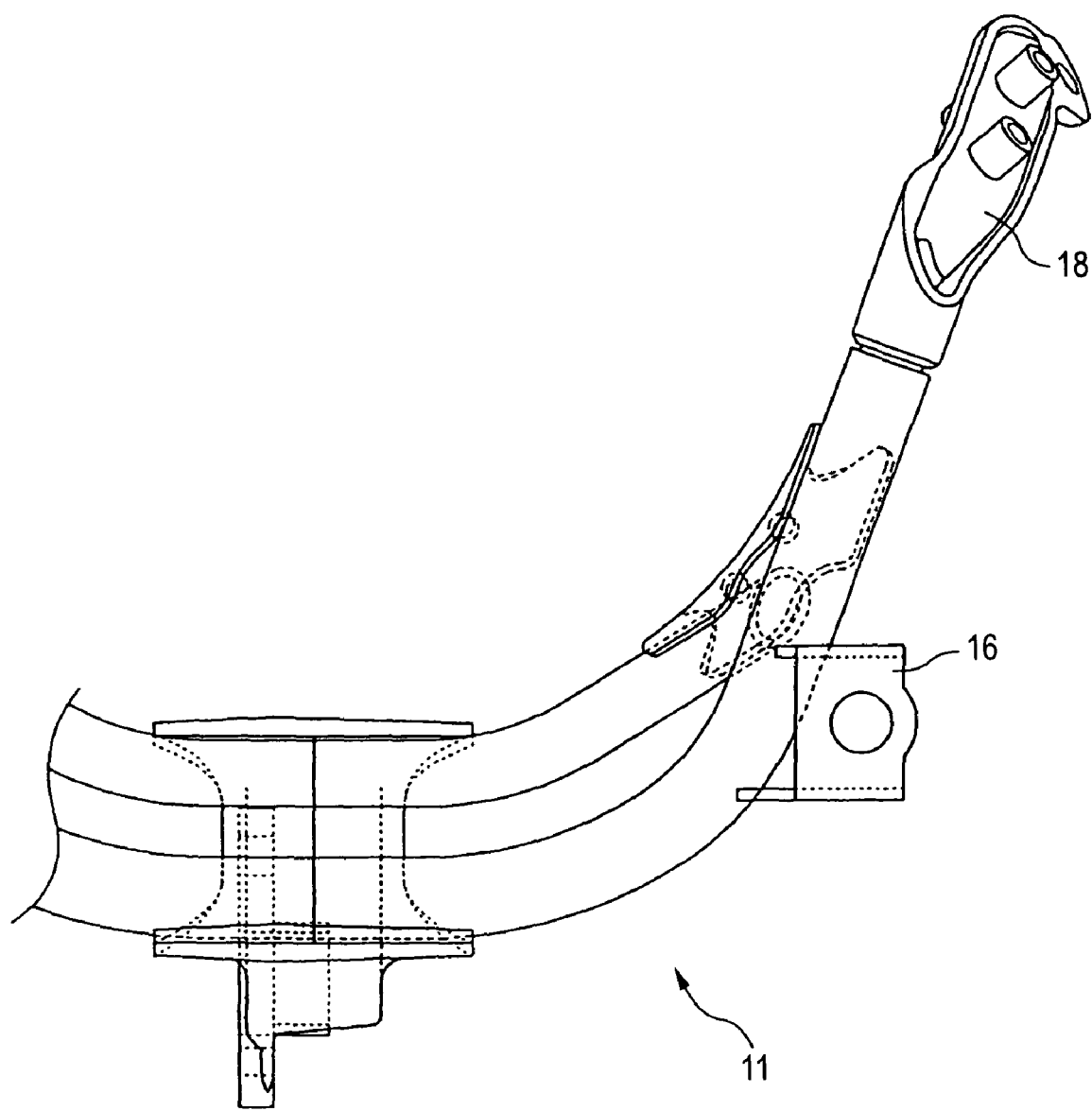
FIG. 3 is a front view of a cowling brace.

On a head pipe 7 (see FIG. 2) which serves as the front head portion of the body frame of the motorcycle 1, there is supported a front fork 9, which supports a front wheel 8, together with a handle bar 10; and, to the front surface of the head pipe 7, there is fixed a cowling brace 11 (which is shown in FIG. 3 as well) using two bolts 12 and the like. This cowling brace 11 is mainly composed of a metal pipe such as an aluminum pipe or a steel pipe.

Figure 4:
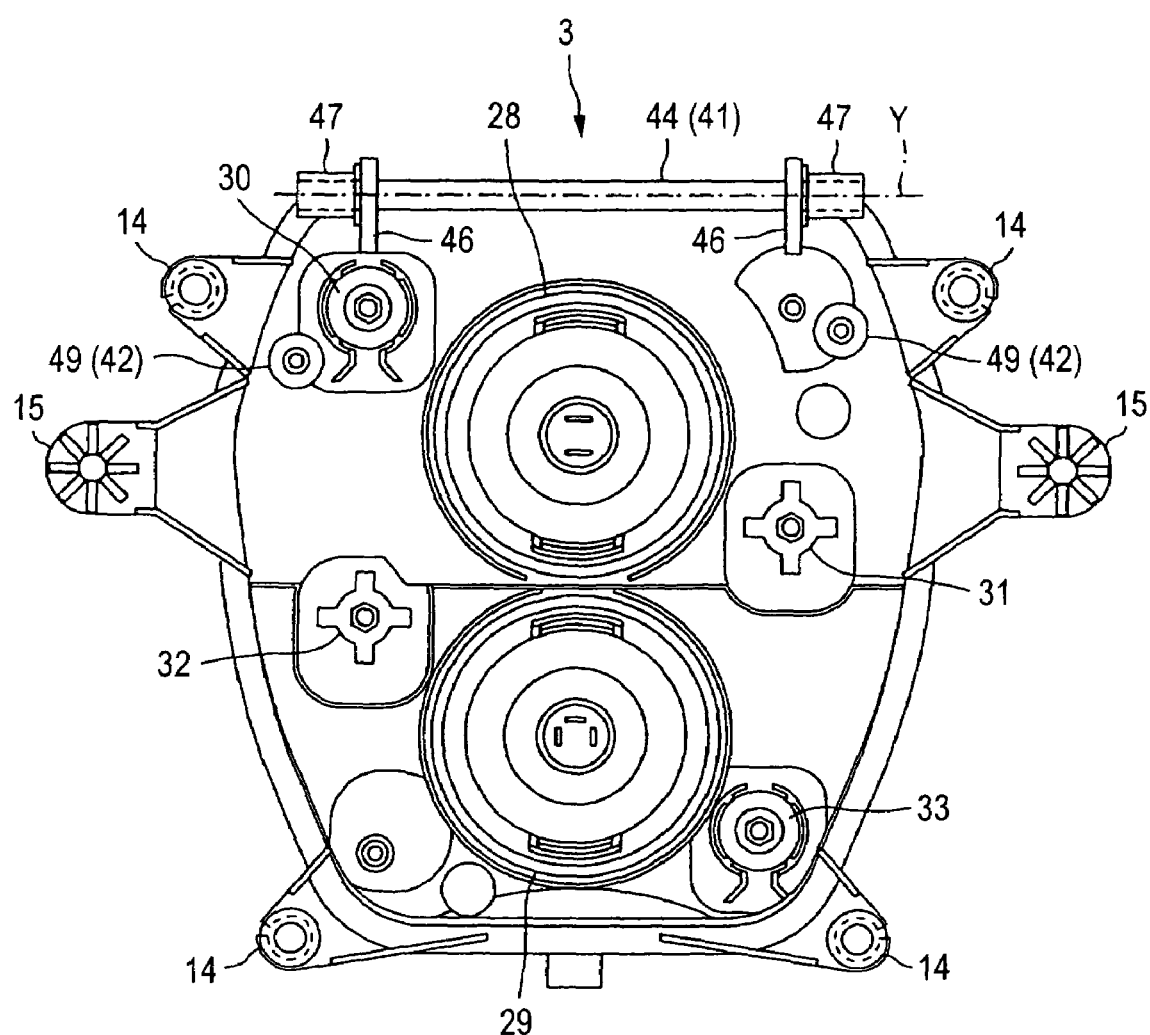
FIG. 4 is a rear view of a head lamp unit.

Now, FIG. 4 is a rear view of the head lamp unit 3. Four fastening pieces 14, which are respectively disposed almost in the four corners of the head lamp unit 3, are screwed to the rear surface side of the front cowling 2, and a pair of right and left positioning bosses 15, which are respectively disposed on the right and left sides of the head lamp unit 3, are inserted in a vibration preventive manner through a rubber cushion 17 (see FIG. 2) into a pair of right and left positioning brackets 16 which are disposed on the cowling brace 11, whereby the head lamp unit 3 and front cowling 2 can be positioned with respect to each other.

And, to a pair of right and left cowling brackets 18 is which are respectively disposed on the upper portion of the cowling brace 11, there is fixed the upper portion of the front cowling 2 together with a side mirror 19; and, the lower portion of the front cowling 2 is connected and fixed through another brackets or stays to an under cowling 20 which is fixed to the body frame using screws or any other connector known.

Figure 5:
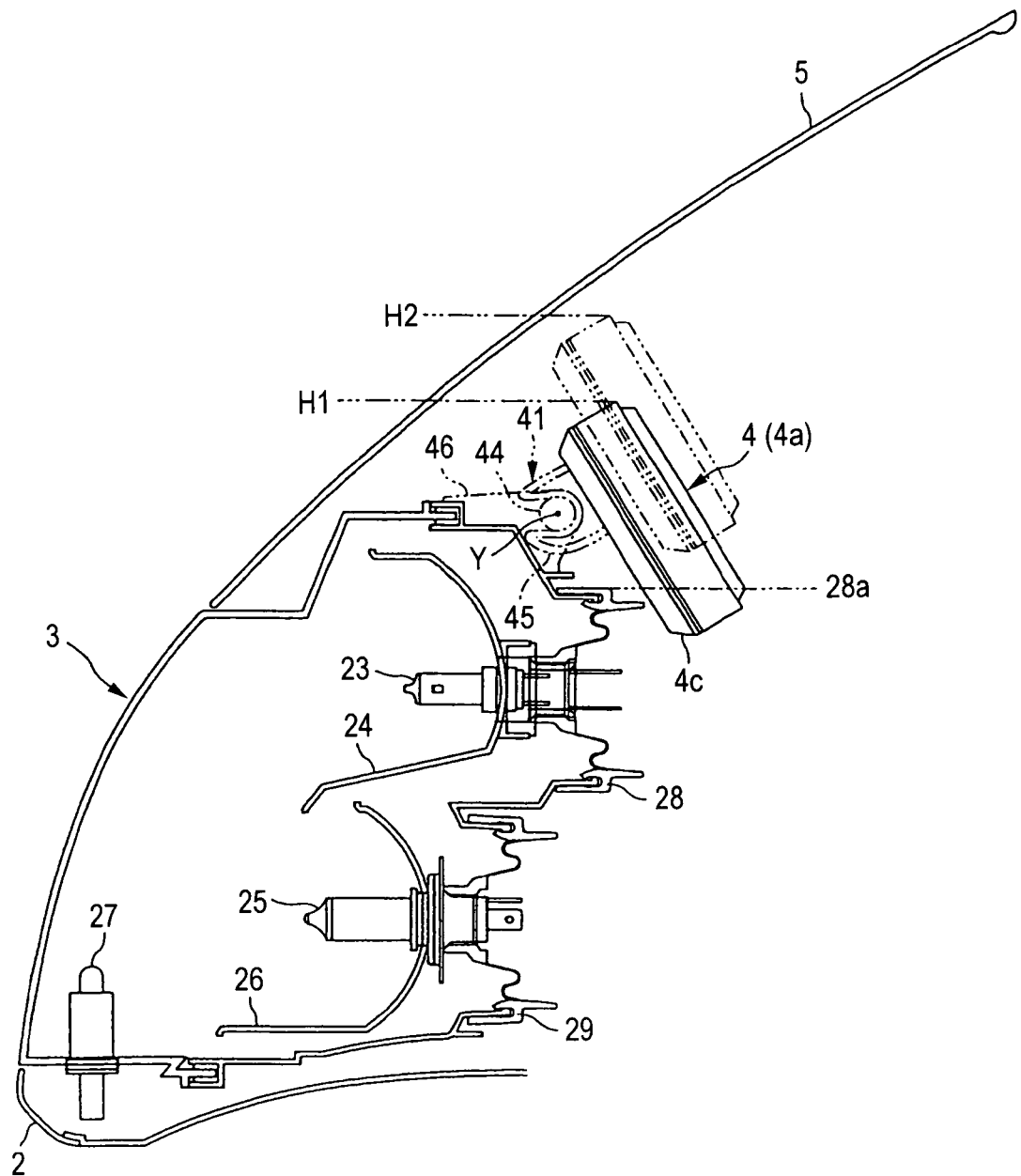
FIG. 5 is a longitudinal section view of a meter unit, showing a state in which it is held at a normal position.
Figure 6:
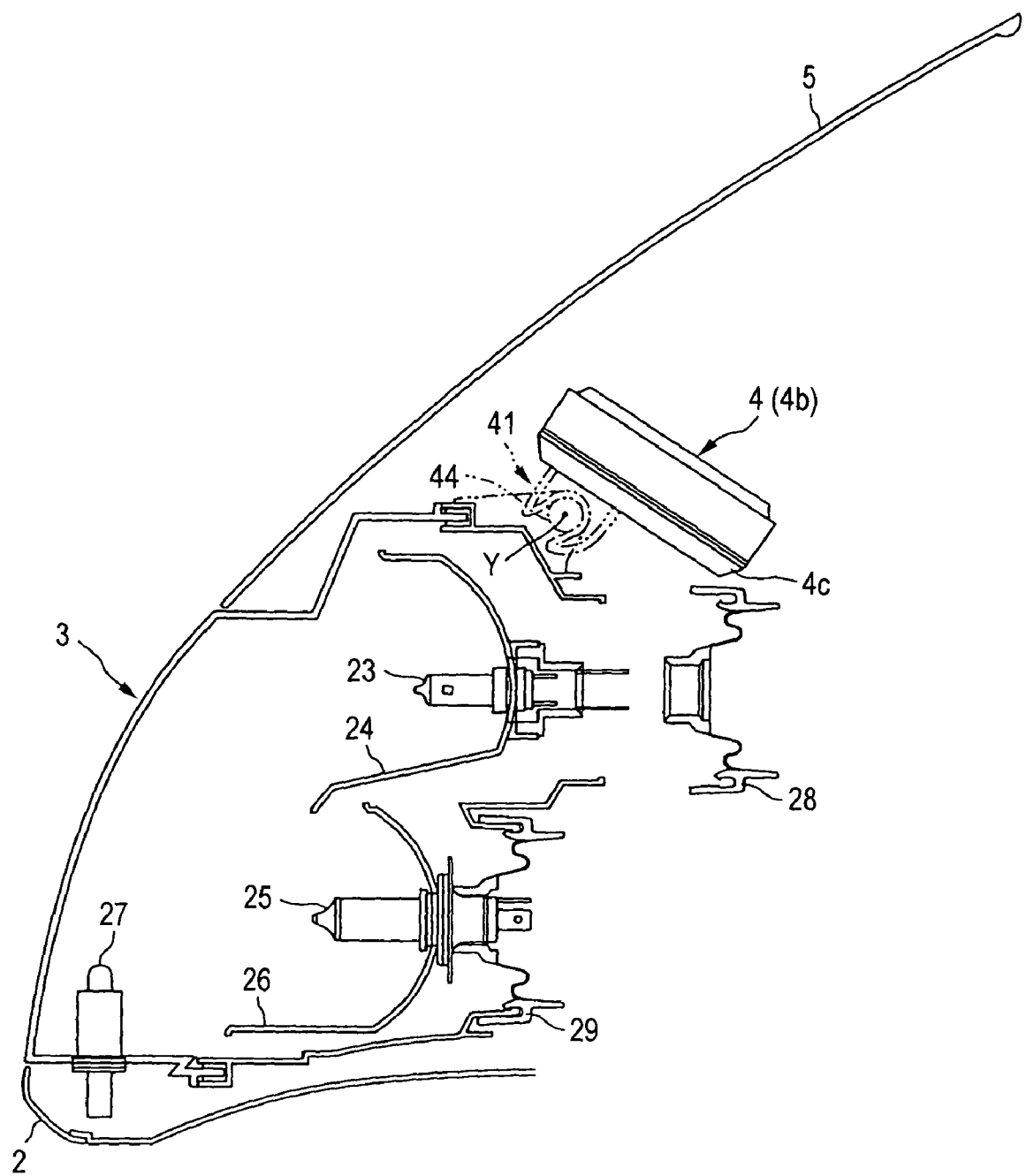
FIG. 6 a longitudinal section view of the embodiment of the present invention, showing a state in which the meter unit is held at a bulb replacing position.

As shown in FIGS. 5 and 6, in the upper portion of the interior of the head lamp unit 3, there are disposed a bulb 23 and a reflector 24 both for a Lo beam, downwardly of them, there are disposed a bulb 25 and a reflector 26 both for a Hi beam and, in front of the bulb 25 and reflector 26, there is disposed a position bulb.

In the rear portion of the head lamp unit 3, there are disposed rubber-boot-shaped bulb mounting and removing portions 28, 29 in correspondence to the positions of the upper and lower bulbs 23, 25. To replace the bulbs 23, 25, the bulb mounting and removing portions 28, 29 may be removed backwardly and the bulbs 23, 25 may be then removed from the sockets of the reflectors 24, 26, thereby being able to replace the bulbs 23, 25. By the way, portions, which are shown by reference characters 30, 31, 32 and 33 in FIG. 4, respectively stand for the optical axis adjusting portions of the respective lamps.

Figure 7:
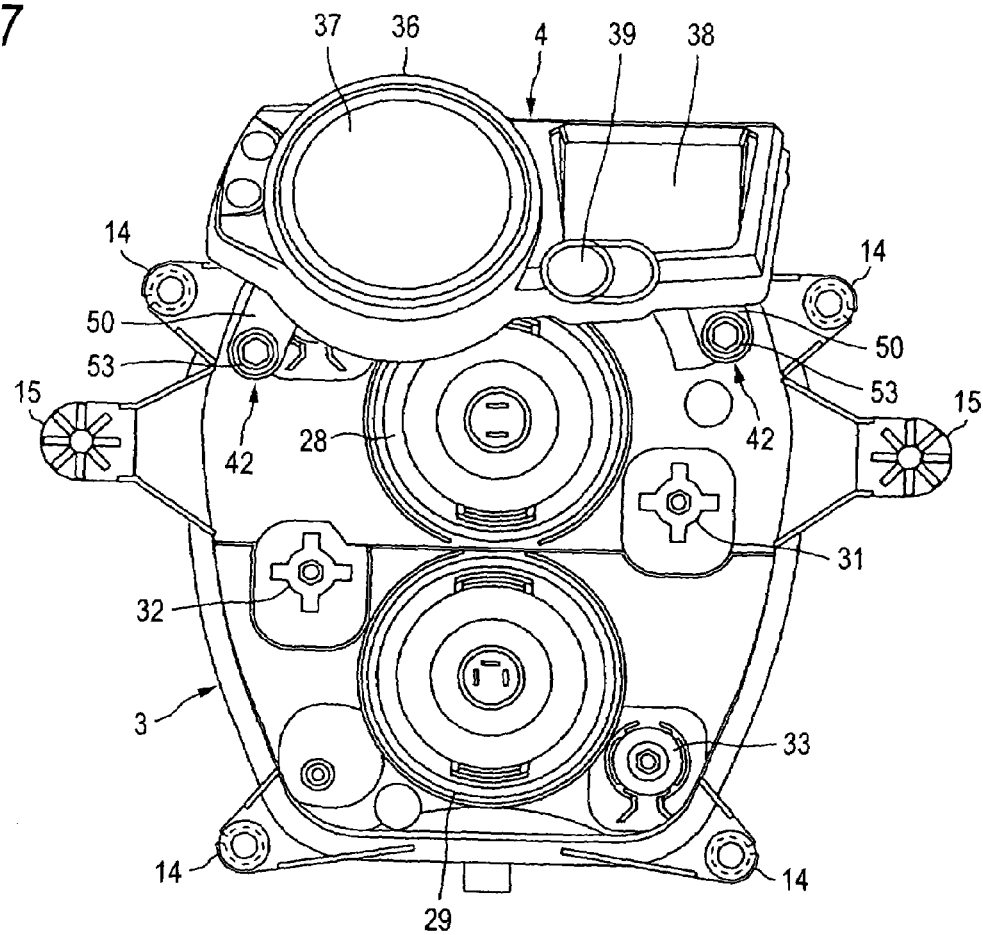
FIG. 7 is a rear view of the meter unit and head lamp unit, showing a state in which the meter unit is mounted on the head lamp unit.
Figure 8:
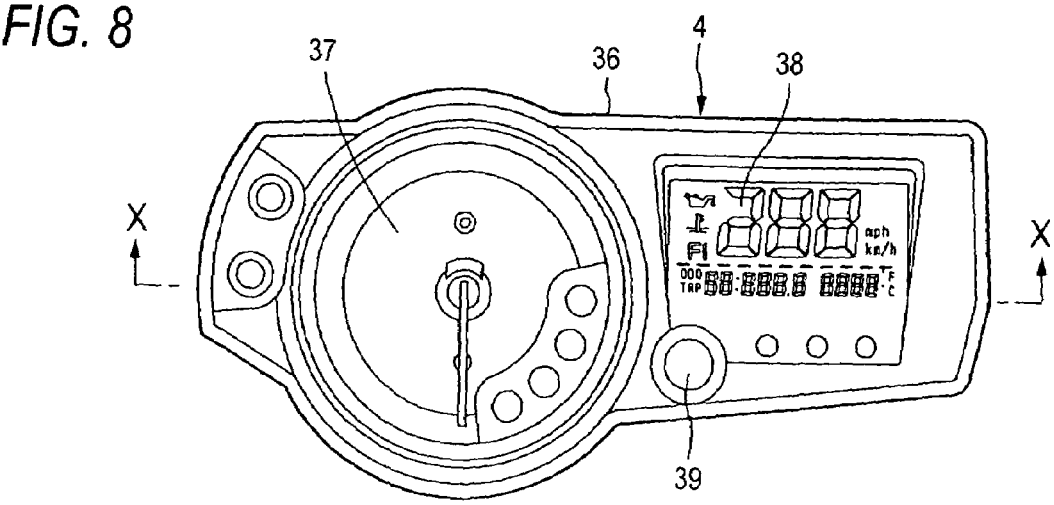
FIG. 8 is a top plan view of the meter unit.

As shown in FIG. 7 as well, the meter unit 4 is mounted directly on the upper rear portion of the head lamp unit 3. The cowling brace 11 is formed so as to have a substantially U-like shape when it is viewed from the front surface of the motorcycle body; the meter unit 4 is located in the intermediate portion of the substantially-U-like shape; and, as shown in FIG. 2, when viewed from the side surface of the motorcycle body, the meter unit 4 is superimposed on top of the cowling brace 11.

As shown in FIGS. 8 to 11, the meter unit 4 is structured such that a tachometer 37, a speed display portion 38, a pilot lamp 39 and various display lamps are disposed in a meter case 36. The meter unit 4 is fixed by two fixing means located on the upper back side and lower back side of the meter unit 4; and, the upper fixing means includes a rotating-type fixing portion 41, while the lower fixing means includes a fastening-type fixing portion 42.

The rotating-type fixing portion 41 is composed of a rotary shaft portion 44 which is disposed on the upper portion of the head lamp unit 3 and extends in the motorcycle-width direction, and a pair of right and left fit-in clamp portions 45 which are disposed on the meter case 36 and can grab the rotary shaft portion 44 in such a manner that it can be rotated with respect to the fit-in clamp portions 45. The neighboring portions of the two ends of the rotary shaft portion 44 are respectively supported by a pair of right and left support posts 46, the two ends of the rotary shaft portion 44 are projected outwardly in the motorcycle-width direction about 2 cm beyond the support posts 46, vibration-preventive rubber bushes 47 are inserted into these projecting portions of the rotary shaft portion 44 respectively, and the fit-in clamp portions 45 of the meter unit 4 are respectively fitted into the rotary shaft portion 44 from above the rubber bushes 47. Due to this rotating-type fixing portion 41, the meter unit 4 can be rotatably held around the rotation axis Y that extends in the motorcycle width direction.

Figure 11:
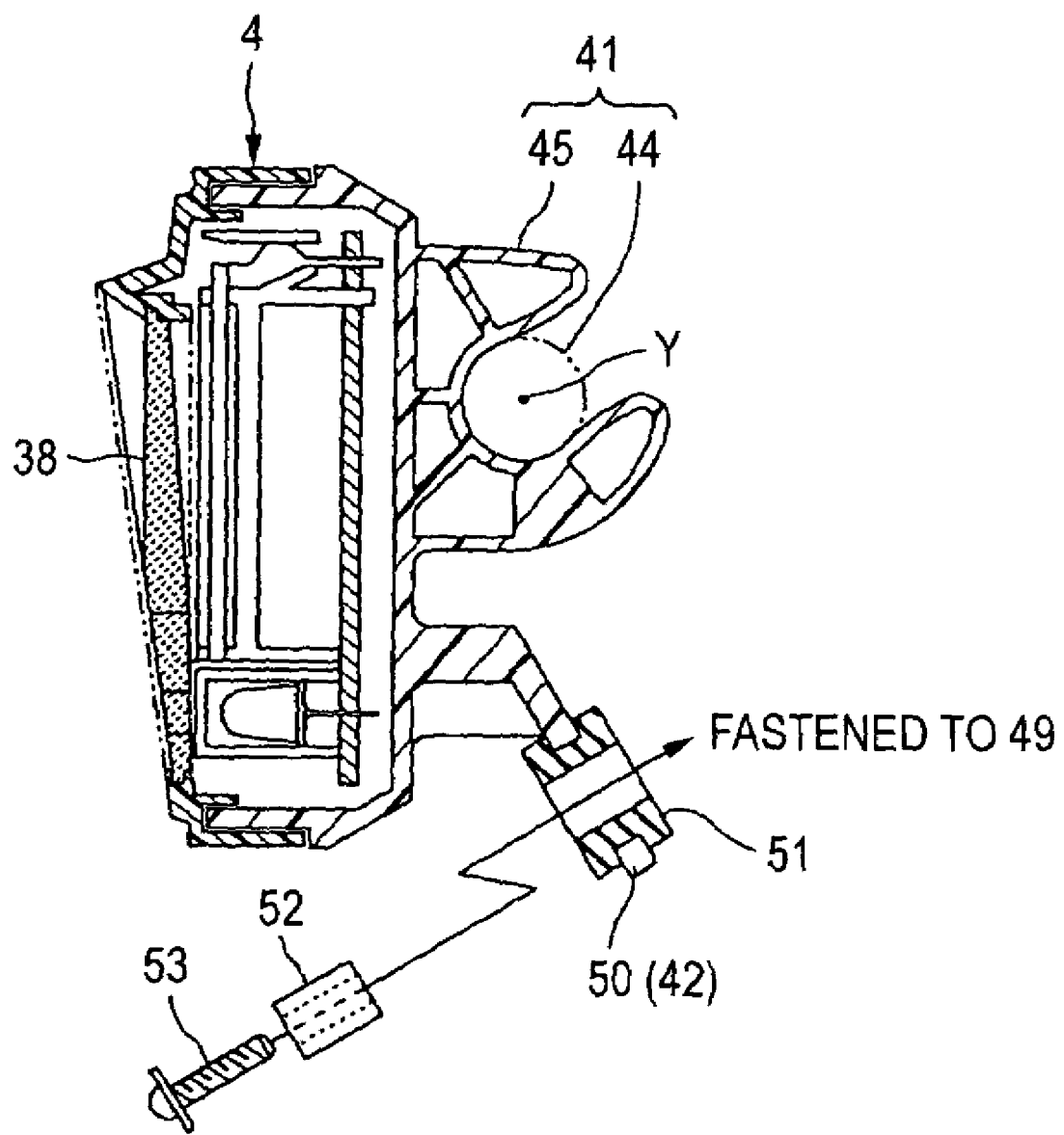

On the other hand, the fastening-type fixing portion 42 is composed of a pair of right and left fastening bosses 49 disposed slightly downwardly of the rotary shaft portion 44 of the head lamp unit 3 and a pair of right and left fastening pieces 50 respectively disposed on the meter case 36 and situated at such positions so as to correspond to the positions of the fastening bosses 49. As shown in FIGS. 2 and 11, with each of the fastening pieces 50, there are fitted a vibration-preventive rubber bush 51 and a metal spacer pipe 52, while a screw 53 to be inserted through the metal spacer pipe 52 is fastened to its associated fastening boss 49. Due to the fastening-type fixing portion 42, the rotation of the meter unit 4 around its rotation axis Y by the rotation-type fixing portion 41 is restricted and thus the meter unit 4 can be firmly fixed to the head lamp unit 3.

By removing the screw 53 of the fastening-type fixing portion 42, the meter unit 4 can be rotated upwardly and downwardly around the rotation axis Y (rotary shaft portion 44); and, as shown in FIGS. 2 and 5, a position where the meter unit 4 is rotated downwardly is considered as a normal position 4a and, as shown in FIG. 6, a position where the meter unit 4 is rotated upwardly is considered as a bulb replacing position 4b.

The position (height) of the meter unit 4 is set in the following manner: that is, as shown in FIG. 5, when the meter unit 4 is present at the normal position 4a, the lower end portion 4c of the meter unit 4 is lower than the upper end line 28a of the bulb mounting and removing portion 28 on the upper side of the head lamp unit 3; and, as shown in FIG. 6, at the bulb replacing position 4b, the lower end portion 4c is higher than the upper end line 28a.

Figure 9:
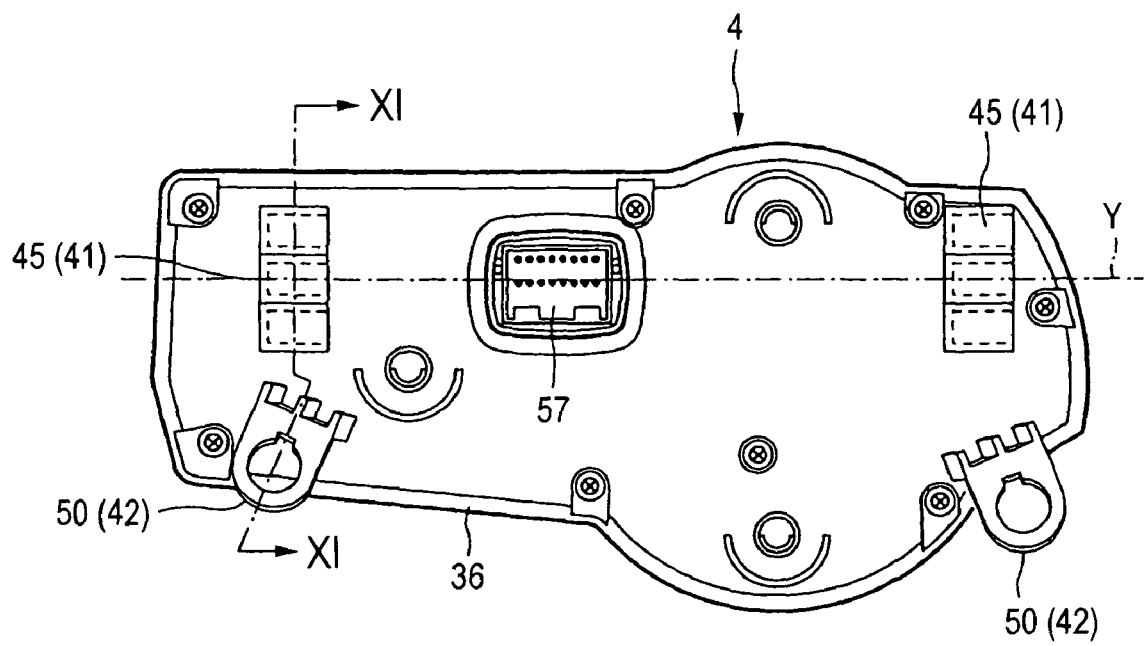
FIG. 9 is a back view of the meter unit.
Figure 10:
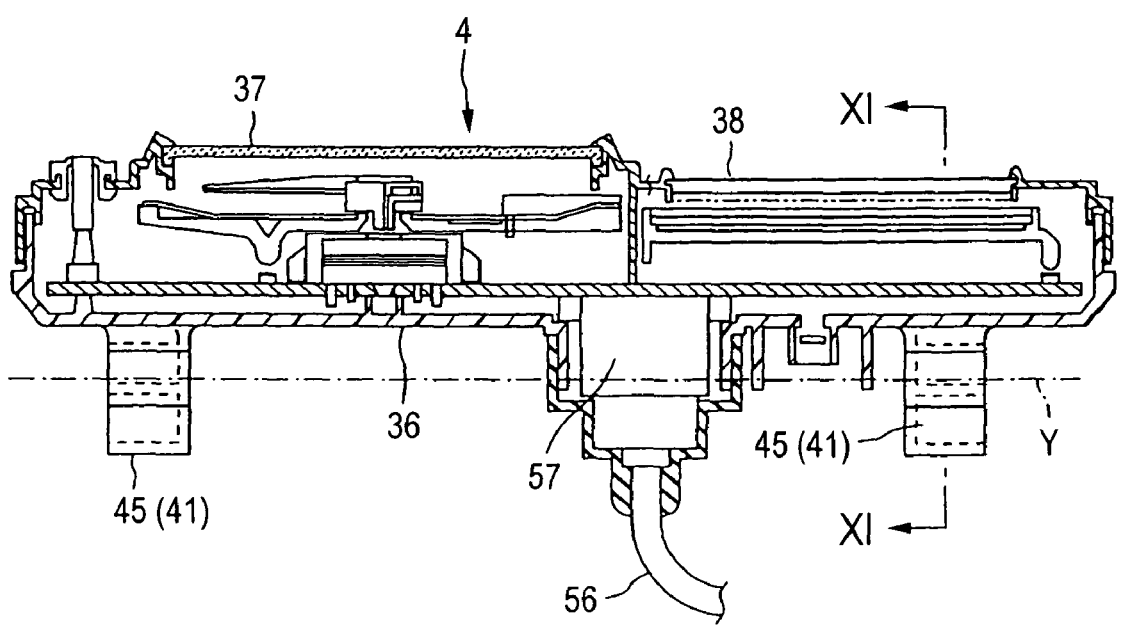
FIG. 10 is a transverse section view of the meter unit, taken along the line X—X shown in FIG. 8; and, FIG. 11 is a longitudinal section view of the meter unit, taken along the line XI—XI shown in FIGS. 9 and 10.

As shown in FIGS. 9 and 10, a wire harness 56 is connected to the back side of the meter unit 4 and a connector 57, which serves as the connecting portion of the wire harness 56, is disposed at a position intermediate between the right and left fit-in clamp portions 45 so as to be situated near to the rotation axis Y of the rotating-type fixing portion 41.

In the above-structured motorcycle, to replace the Lo-beam bulb 23 of the head lamp unit 3, the screws 53 of the right and left fastening-type fixing portions 42 maybe removed, the meter unit 4 may be then lifted upwardly in such a manner as shown in FIG. 6, and the meter unit 4 may be next rotated around the rotation axis Y (rotary shaft portion 44) to thereby shift the meter unit 4 from the normal position 4a to the bulb replacing position 4b.

At the bulb replacing position 4b, the meter unit 4 is higher in position than the height of the upper-side bulb mounting and removing portion 28 and, therefore, access to the bulb mounting and removing portion 28 is very easy. And, the bulb mounting and removing portion 28 is removed, the bulb 23 is replaced, and then the bulb mounting and removing portion 28 is mounted again. After then, the meter unit 4 is rotated downwardly and is thereby shifted to the normal position 4a, and then the screws 53 of the fastening-type fixing portion 42 are fastened to thereby fix the meter unit 4.

According to the above structure, as shown in FIG. 5, since the height H1 of the meter unit 4 at the normal position 4a can be set much lower than the conventional meter unit height H2, in the riding time, the meter unit 4 is prevented from projecting into the front field of vision for a rider, thereby being able to secure a good front field of vision. The heights H and H2 are also the effective vision field portions of the screen 5.

Like the head lamp unit 3 illustrated in the present embodiment, in a head lamp unit of a vertically long design in which the Lo-beam bulb 23 and Hi-beam bulb 25 are disposed vertically, especially, the position of the meter unit 4 is liable to be high and thus the meter unit 4 is liable to provide an obstacle to the front field of vision. However, according to the above structure, even in the case of a head lamp unit of a vertically long design, there can be provided a good front field of vision.

The meter unit 4 is fixed to the head lamp unit 3 using the rotating-type fixing portion 41 located on the upper back side of the meter unit 4 and the fastening-type fixing portion 42 located on the lower back side of the meter unit 4. Thanks to this arrangement, by loosening the screw 53 of the fastening-type fixing portion 42 to thereby rotate the meter unit 4 upwardly around the rotation axis Y of the rotating-type fixing portion 41, the meter unit 4 can be easily shifted to the bulb replacing position 4b, which makes it very easy to replace the bulbs of the head lamp unit 3. Also, the optical axis adjustments using the optical axis adjusting portions 30, 31, 32 and 33 are also very easy.

Since the rotating-type fixing portion 41 is composed of the rotary shaft portion 44 disposed on the head lamp unit 3 and extending in the motorcycle width direction and the two fit-in clamp portion 45 disposed on the meter unit 4 side for grabbing the rotary shaft portion 44, it is also very simple to remove the meter unit 4 from the head lamp unit 3 completely, thereby being able to enhance the efficiency of the mounting and removing operation of the meter unit 4. This can also contribute for enhancing the fixing operation of the motorcycle 1.

Further, because the connector 57 of the wire harness 56 to be connected to the meter unit 4 is disposed in the vicinity of the rotation axis Y of the rotating-type fixing portion 41, the moving amount of the connector 57 when the meter unit 4 is rotated around the rotation axis Y can be minimized. This not only can smooth the rotational movement of the meter unit 4 but also can enhance the durability of the wire harness 56 and connector 57.

By the way, since the meter unit 4 is mounted directly on the heat lamp unit 3, there can be eliminated the need for provision of a special fixing portion which is used to fix the meter unit 4 to the cowling brace 11 and also it is possible to soften the rigidity of the cowling brace 11 of which high rigidity has been conventionally required so as to hold the meter unit 4 without causing the meter unit 4 to resonate with the riding vibrations of the motorcycle 1. Thanks to this, the structure of the cowling brace 11 can be simplified, the manufacture of the cowling brace 11 can be facilitated, and the weight of the cowling brace 11 can be reduced greatly.

Also, because there is employed a lay-out in which the meter unit 4 is superimposed on top of the cowling brace 11 when viewed from the side surface of the motorcycle body, the height of the meter unit 4 is lowered while avoiding mutual interference between the cowling brace 11 and meter unit 4, thereby being able to secure the front field of vision for the rider and, at the same time, the bulb replacing operation of the head lamp unit 3 can be facilitated still further.

Further, since the cowling brace 11 is not present between the rear surface of the head lamp unit 3 and motorcycle body frame front head portion (head pipe 7), access to the bulb mounting and removing portions 28, 29 is easy and thus the efficiency of the bulb replacing operation can be enhanced. And, because the distance between the head lamp unit 3 and motorcycle body frame front head portion can be shortened, the size of the front cowling 2 can be reduced, thereby being able to eliminate a fear that the rigidity of the front cowling 2 can be short, for example, in the high speed riding operation of the motorcycle.

By the way, the motorcycle 1 illustrated in the present embodiment is a motorcycle including the front cowling 2. However, the structures of the composing parts of a motorcycle body front structure according to the invention can also be applied to a motorcycle of a type which does not include a front cowling. Also, the cowling brace 11, which has been described in the present embodiment, may also be a special brace which is exclusively used to hold the head lamp unit 3 and the like.

As has been described heretofore, according to the front structure of a motorcycle body of the present invention, while securing the good front field of vision for the rider and the good visibility of the meter unit, the bulb replacing operation of the head lamp unit can be facilitated, the peripheral structure of the meter unit can be simplified, and the durability of the wire harness to be connected to the meter unit can be enhanced.

What is claimed is:

1. A front structure of a motorcycle body comprising:
   a head lamp unit including a bulb mounting and removing portion disposed in the rear surface thereof, and
   a meter unit disposed in the vicinity of the upper rear portion of the head lamp unit,
   wherein the meter unit is disposed pivotably between a first position and a second position, and
   wherein the first position is a normal position and the second position is a bulb replacing position.

2. A front structure of a motorcycle body according to claim 1,
   wherein the first position, the lower end portion of the meter unit is positioned lower than the upper end of the bulb mounting and removing portion, and
   in the second position, the lower end portion of the meter unit is positioned higher than the upper end of the bulb mounting and removing portion.

3. The front structure of a motorcycle body comprising:
   a head lamp unit including a bulb mounting and removing portion disposed in the rear surface thereof, and
   a meter unit disposed in the vicinity of the upper rear portion of the head lamp unit,
   wherein the meter unit is disposed movably between a first position and a second position,
   wherein the first position is a normal position and the second position is a bulb replacing position,
   wherein, in the first position, the lower end portion of the meter unit is positioned lower than the upper end of the bulb mounting and removing portion,
   in the second position, the lower end portion of the meter unit is positioned higher than the upper end of the bulb mounting and removing portion, and
   wherein the meter unit is mounted directly on the head lamp unit and, when viewed from side of the motorcycle body, the meter unit is superimposed on top of a cowling brace for fixing a front cowling to the motorcycle body.

4. A front structure of a motorcycle body according to claim 1, further comprises:
   an upper fixing means located on upper back side of the meter unit including a rotatable fixing portion to hold the meter unit rotatably around a rotation axis extending in the motorcycle width direction, and
   a lower fixing means located on lower back side of the meter unit including a fastenable fixing portion to hold the meter unit and restrict the rotational movement of the meter unit.

5. A front structure of a motorcycle body according to claim 2, further comprises:
   an upper fixing means located on upper back side of the meter unit including a rotatable fixing portion to hold the meter unit rotatably around a rotation axis extending in the motorcycle width direction, and
   a lower fixing means located on lower back side of the meter unit including a fastenable fixing portion to hold the meter unit and restrict the rotational movement of the meter unit.

6. A front structure of a motorcycle body according to claim 5,
   wherein the normal position is a position where the meter unit is rotated downwardly around the rotation axis, and
   the bulb replacing position is a position where the meter unit is rotated upwardly around the rotation axis.

7. A front structure of a motorcycle body comprising:
   a head lamp unit including a bulb mounting and removing portion disposed in the rear surface thereof;
   a meter unit disposed in the vicinity of the upper rear portion of the head lamp unit;
   an upper fixing means located on upper back side of the meter unit including a rotatable fixing portion to hold the meter unit rotatably around a rotation axis extending in the motorcycle width direction; wherein the rotatable fixing portion comprises:
      a rotary shaft portion disposed on a member extending in the motorcycle width direction to hold the meter unit, and
      a fit-in clamp portion disposed on the meter unit for grabbing the rotary shaft portion rotatably; and
   a lower fixing means located on lower back side of the meter unit including a fastenable fixing portion to hold the meter unit and restrict the rotational movement of the meter unit;
   wherein the meter unit is disposed movably between a first position and a second position,
   wherein the first position is a normal position and the second position is a bulb replacing position,
   wherein, in the first position, the lower end portion of the meter unit is positioned lower than the upper end of the bulb mounting and removing portion,
   in the second position, the lower end portion of the meter unit is positioned higher than the upper end of the bulb mounting and removing portion,
   wherein the normal position is a position where the meter unit is rotated downwardly around the rotation axis, and
   the bulb replacing position is a position where the meter unit is rotated upwardly around the rotation axis.

8. A front structure of a motorcycle body comprising:
   a head lamp unit including a bulb mounting and removing portion disposed in the rear surface thereof;
   a meter unit disposed in the vicinity of the upper rear portion of the head lamp unit;
   an upper fixing means located on upper back side of the meter unit including a rotatable fixing portion to hold the meter unit rotatably around a rotation axis extending in the motorcycle width direction;
   a lower fixing means located on lower back side of the meter unit including a fastenable fixing portion to hold the meter unit and restrict the rotational movement of the meter unit; and
   a connecting portion of a wire harness to be connected to the meter unit disposed in the vicinity of the rotation axis of the rotatable fixing portion;
   wherein the meter unit is disposed movably between a first position and a second position,
   wherein the first position is a normal position and the second position is a bulb replacing position, wherein, in the first position, the lower end portion of the meter unit is positioned lower than the upper end of the bulb mounting and removing portion, in the second position, the lower end portion of the meter unit is positioned higher than the upper end of the bulb mounting and removing portion, and wherein the normal position is a position where the meter unit is rotated downwardly around the rotation axis, and the bulb replacing position is a position where the meter unit is rotated upwardly around the rotation axis.

9. The front structure of a motorcycle body according to claim 1, wherein the bulb mounting and removing portion is removable towards a rear direction of the motorcycle body.

10. The front structure of a motorcycle body according to claim 1, further comprising a bulb disposed in the head lamp unit, wherein the bulb is removable from the head lamp unit towards a rear direction of the motorcycle body after removing the bulb mounting and removing portion.

11. A front structure of a motorcycle body comprising:
   a head lamp unit including a bulb mounting and removing portion disposed in the rear surface thereof;
   a meter unit disposed in the vicinity of the upper rear portion of the head lamp unit; and
   a rotatable fixing portion located on upper back side of the meter unit to hold the meter unit rotatably around a rotation axis extending in the motorcycle width direction including:
   a rotary shaft portion disposed on a member extending in the motorcycle width direction to hold the meter unit; and
   a fit-in clamp portion disposed on the meter unit for grabbing the rotary shaft portion rotatably;
   wherein the meter unit is disposed movably between a first position and a second position, and
   wherein the first position is a normal position and the second position is a bulb replacing position.

12. A front structure of a motorcycle body comprising:
   a head lamp unit including a bulb mounting and removing portion disposed in the rear surface thereof;
   a meter unit disposed in the vicinity of the upper rear portion of the head lamp unit;
   a rotatable fixing portion located on an upper back side of the meter unit to hold the meter unit rotatably around a rotation axis extending in the motorcycle width direction; and
   a connecting portion of a wire harness to be connected to the meter unit disposed in the vicinity of the rotation axis of the rotatable fixing portion;
   wherein the meter unit is disposed movably between a first position and a second position, and
   wherein the first position is a normal position and the second position is a bulb replacing position.

* * * * *